(12) United States Patent
Clark et al.

(10) Patent No.: US 11,181,908 B2
(45) Date of Patent: Nov. 23, 2021

(54) ACCESS RIGHTS OF TELEPRESENCE ROBOTS

(71) Applicant: HEWLETT-PACKARD DEVELOPMENT COMPANY, L.P., Houston, TX (US)

(72) Inventors: Alexander Wayne Clark, Houston, TX (US); Robert Campbell, Palo Alto, CA (US)

(73) Assignee: Hewlett-Packard Development Company, L.P., Spring, TX (US)

(*) Notice: Subject to any disclaimer, the term of this patent is extended or adjusted under 35 U.S.C. 154(b) by 361 days.

(21) Appl. No.: 16/081,472

(22) PCT Filed: Sep. 20, 2016

(86) PCT No.: PCT/US2016/052669
§ 371 (c)(1),
(2) Date: Aug. 31, 2018

(87) PCT Pub. No.: WO2018/056954
PCT Pub. Date: Mar. 29, 2018

(65) Prior Publication Data
US 2019/0072950 A1 Mar. 7, 2019

(51) Int. Cl.
*G06F 17/00* (2019.01)
*G05D 1/00* (2006.01)
*G06F 21/31* (2013.01)
*G07C 9/21* (2020.01)
(Continued)

(52) U.S. Cl.
CPC ........... *G05D 1/0038* (2013.01); *G06F 21/31* (2013.01); *G07C 9/21* (2020.01); *G07C 9/27* (2020.01); *H04L 63/105* (2013.01); *H04L 63/107* (2013.01); *G05D 2201/0211* (2013.01); *G06F 2221/2111* (2013.01)

(58) Field of Classification Search
CPC ............ G05D 1/0038; G05D 2201/02; G05D 2201/0211; G07C 9/27; G07C 9/21; G07C 9/20; G06F 21/31; G06F 2221/2111; H04L 63/105; H04L 63/107; H04L 63/08; H04W 12/08
USPC ....................................................... 700/264
See application file for complete search history.

(56) References Cited

U.S. PATENT DOCUMENTS

| 8,717,447 | B2 | 5/2014 | Shuster |
| 9,050,723 | B1 | 6/2015 | Elazary et al. |
| 9,227,319 | B2 | 1/2016 | Kim |

(Continued)

OTHER PUBLICATIONS

A. Kristoffersson, S. Coradeschi and A. Loutfi, 'A Review of Mobile Robotic Telepresence', in Advances in Human-Computer Interaction, vol. 2013 (Feb. 2013), pp. 1-17.

(Continued)

*Primary Examiner* — Ronnie M Mancho
(74) *Attorney, Agent, or Firm* — HP Inc. Patent Department (57) ABSTRACT

An example non-transitory computer-readable medium includes instructions. The instructions, when executed by a processor, cause the processor to determine access rights of a telepresence robot to a physical location based on access rights of a user that is to control the telepresence robot. The instructions, when executed by a processor, cause the processor to assign the determined access rights to the telepresence robot.

17 Claims, 6 Drawing Sheets

(51) Int. Cl.
*G07C 9/27* (2020.01)
*H04L 29/06* (2006.01)

(56) References Cited

U.S. PATENT DOCUMENTS

| | | | |
|---|---|---|---|
| 2005/0044906 A1* | 3/2005 | Spielman | G07C 9/38 |
| | | | 70/63 |
| 2007/0064092 A1* | 3/2007 | Sandbeg | H04N 7/142 |
| | | | 348/14.02 |
| 2007/0120965 A1* | 5/2007 | Sandberg | H04N 7/147 |
| | | | 348/14.08 |
| 2010/0042846 A1 | 2/2010 | Trotter et al. | |
| 2013/0158708 A1 | 6/2013 | Bertil | |
| 2014/0250413 A1* | 9/2014 | Jones | G06F 3/011 |
| | | | 715/863 |
| 2015/0077502 A1 | 3/2015 | Charles et al. | |
| 2015/0100461 A1* | 4/2015 | Baryakar | B25J 19/023 |
| | | | 705/26.43 |
| 2015/0352722 A1 | 12/2015 | Herzog et al. | |
| 2016/0116915 A1* | 4/2016 | Pulleti | G01S 13/50 |
| | | | 701/3 |
| 2016/0229058 A1 | 8/2016 | Pinter et al. | |
| 2016/0330182 A1* | 11/2016 | Jeon | A43B 3/0005 |
| 2019/0114925 A1* | 4/2019 | Schulman | G06F 21/31 |

OTHER PUBLICATIONS

Meet First Robot to Get Id Card at World Economic Forum in Davos, Jan. 22, 2016, http://m.dailyhunt.in/news/india/english/deccan-chronicle-epaper-deccanch/meet-first-robot-to-get-id-card-at-world-economic-forum-in-davos-newsid-48780428.
Ramblebot-Telepresence Robot You Control Remotely Online, 2015, < http://www.ramblebot.com/ >.
"Meet First Robot to Get ID Card at World Economic Forum in Davos", Retrieved from internet—https://m.dailyhunt.in/news/india/english/deccan+chronicle-epaper-deccanch/meet+first+robot+to+get+id+card+at+world+economic+forum+in+davos-newsid-48780428, Jan. 22, 2016, 1 Page.
"RambleBot Telepresence Robot New", Retrieved from internet—http://www.ramblebot.com/, 2015, 6 Pages.

* cited by examiner

ACCESS RIGHTS OF TELEPRESENCE ROBOTS

BACKGROUND

Robots may assist users with various tasks and improve the productivity of users. A robot may include motors, hydraulics, or the like that allow the robot to move a plurality of components. The movements may be controlled electronically. For example, the robot may include digital or analog circuitry to control the movement of the motors, hydraulics, etc. The robot may include a processor that determines which movements to make, may receive user input indicating which movements to make, or the like. Based on the processor determinations or user input, the robot may accomplish the various tasks.

DETAILED DESCRIPTION

A user may control a telepresence robot. As used herein, the term "telepresence robot" refers to a robot that is able to receive commands from a user and communicate audio or video recorded by the telepresence robot to the user. The telepresence robot may be mobile. For example, the telepresence robot may be able to move about a building. The user may navigate the telepresence robot, for example, by directly controlling the steering and propulsion of the robot. Alternatively, or in addition, the user may select a destination, and the telepresence robot may navigate itself to the indicated destination. The telepresence robot may capture video of its surroundings and transmit the video to the user. The user may also, or instead, capture video of the user and display the video on the telepresence robot.

In some examples, a user may wish to navigate the telepresence robot about a secure location. For example, the location may include areas whose access is restricted to a particular set of people. The people with access may be assigned credentials that can be used to access the restricted areas. For example, each person with access may have a device usable to present the credentials, information usable to retrieve the credentials, or the like. In some examples, a biometric reader may retrieve the credentials based on biometric information determined from a biological characteristic of the person seeking access.

The telepresence robot may be controlled by users with varying sets of access rights to physical locations. For example, a first user may control the telepresence robot and navigate it to a first restricted location. A second user may not have access to the first restricted location but may wish to control the telepresence robot. If the telepresence robot is provided with access rights to the first restricted location, the second user may be able to access a location for which the second user does not have access rights. If the telepresence robot is not provided with access rights to the second restricted location, the first user may not be able to use the telepresence robot for the first user's intended purpose. The usefulness and security of the telepresence robot would be improved if the first user was provided access to the first restricted location but the second user was not.

Figure 1:
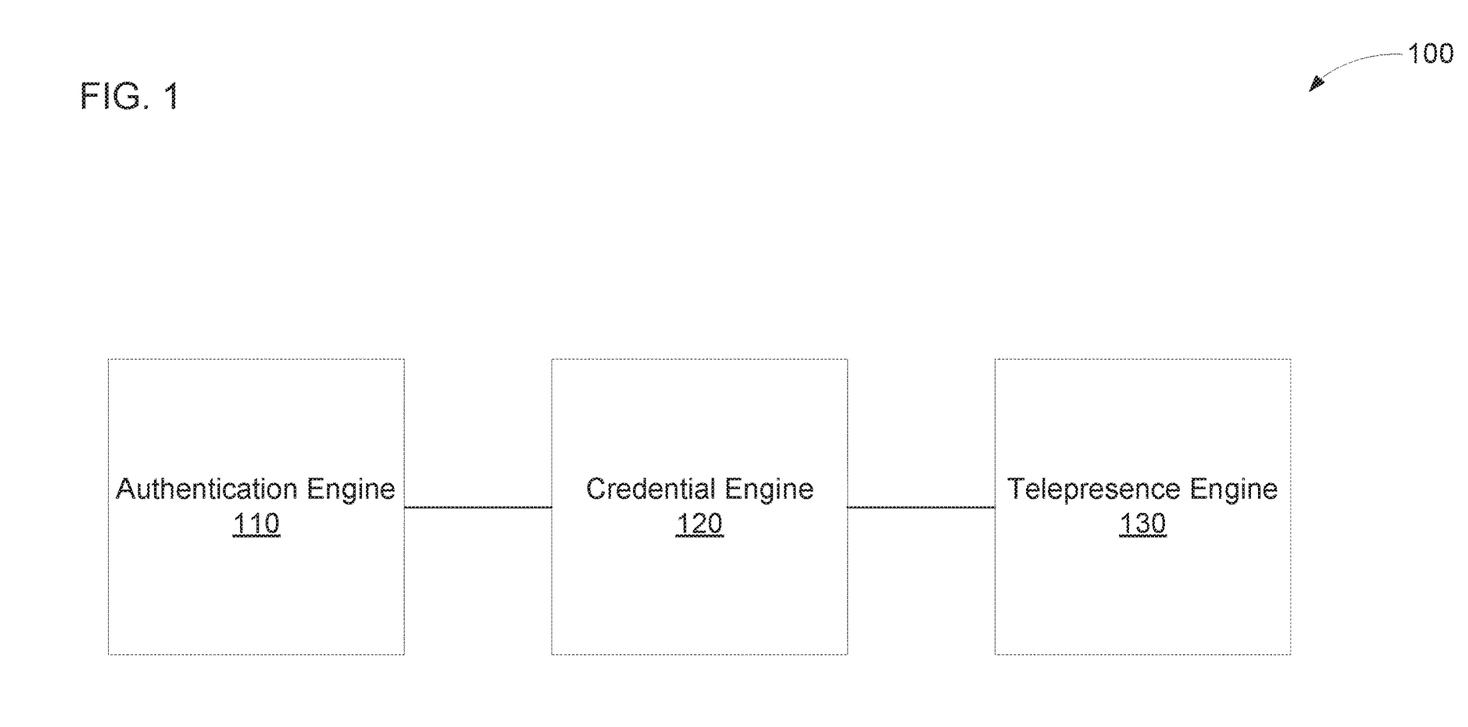
FIG. 1 is a block diagram of an example system to generate a credential for a telepresence robot.

FIG. 1 is a block diagram of an example system 100 to generate a credential for a telepresence robot. The system 100 may include an authentication engine 110. As used herein, the term "engine" refers to hardware (e.g., a processor, such as an integrated circuit or other circuitry) or a combination of software (e.g., programming such as machine- or processor-executable instructions, commands, or code such as firmware, a device driver, programming, object code, etc.) and hardware. Hardware includes a hardware element with no software elements such as an application specific integrated circuit (ASIC), a Field Programmable Gate Array (FPGA), etc. A combination of hardware and software includes software hosted at hardware (e.g., a software module that is stored at a processor-readable memory such as random access memory (RAM), a hard-disk or solid-state drive, resistive memory, or optical media such as a digital versatile disc (DVD), and/or executed or interpreted by a processor), or hardware and software hosted at hardware. The authentication engine 110 may authenticate user credentials of a user. For example, the user may provide the user credentials directly or indirectly to the authentication engine 110. The authentication engine 110 may verify the identity of the user based on the credentials.

The system 100 may also include a credential engine 120. The credential engine 120 may determine rights of the user. For example, the user credential may be associated with rights to access particular physical locations. The credential engine 120 may determine the rights of the user to access the particular physical locations. The credential engine may generate a credential for a telepresence robot. The credential may be usable by the telepresence robot to access a physical location. The credential may have the rights of the user. Accordingly, the telepresence robot may use the credential to access physical locations that are accessible to the user.

The system 100 may include a telepresence engine 130. The telepresence engine 130 may provide control of the telepresence robot to the user. For example, the telepresence engine 130 may allow the user to navigate the telepresence robot to various physical locations. The credential may allow the user to navigate the telepresence robot to physical locations that would be accessible to the user. The credential may not allow the user to navigate the telepresence robot to physical locations that would not be accessible to the user. Accordingly, the system 100 may secure physical locations against unauthorized access by users of the telepresence robot while still maximizing usability of the telepresence robot for the user.

Figure 2:
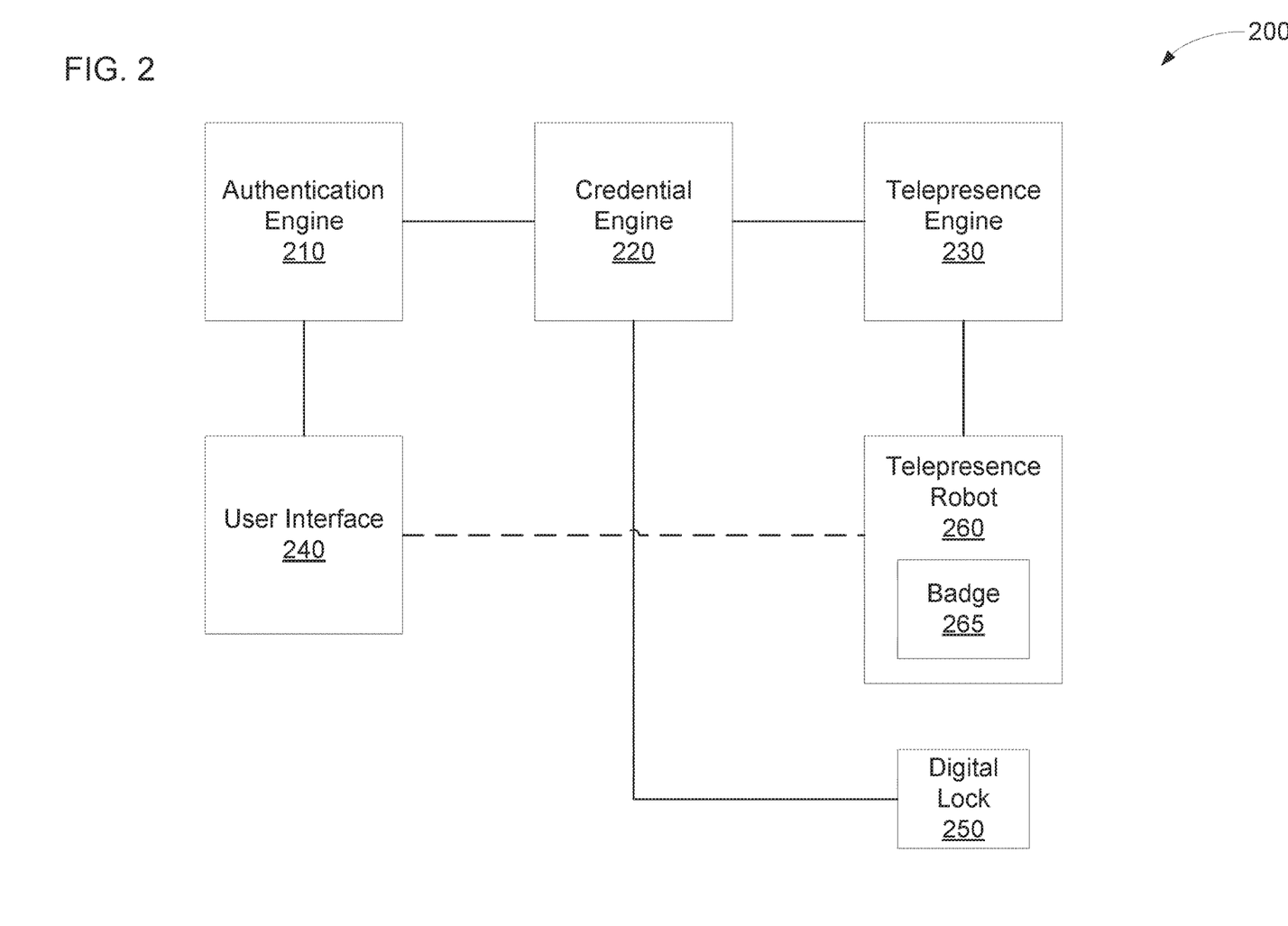
FIG. 2 is a block diagram of another example system to generate a credential for a telepresence robot.

FIG. 2 is a block diagram of another example system 200 to generate a credential for a telepresence robot 260. The system 200 may include an authentication engine 210. The authentication engine 210 may authenticate user credentials of a user. In an example, the authentication engine 210 may be communicatively coupled with a user interface 240 with which the user may interact. The user interface 240 may include a computer, such as a personal computer, a notebook computer, a mobile device, etc.; a non-transitory computer-readable medium containing instructions, which when executed, produce a graphical user interface; or the like. The system 200 may include the user interface 240 or may be communicatively coupled to, but not include, the user interface 240.

The user interface 240 may receive credentials from the user that are usable to authenticate the user. For example, the user may possess a badge, and the user interface 240 may include or may be communicatively coupled with a badge reader. As used herein, the term "badge" refers to a non-transitory computer readable medium containing information usable to authenticate a person in possession of the badge or logic able to produce information usable to authenticate a person in possession of the badge. For example, the badge may include a card, which may include a magnetic strip containing credentials, a radio frequency identification (RFID) tag, a smart card, or the like. In an example, the user may provide credentials to the user interface 240 with a mobile phone. For example, the phone may communicate the credentials via Bluetooth, near field communication (NFC), WiFi, or the like. The user interface 240 may communicate the user credentials to the authentication engine 210, which may authenticate the user based on the user credentials.

In some examples, the user interface 240 may authenticate the user. For example, the user may provide login information to the user interface 240, may sign in using a smart card, may provide a one-time password, or the like. The user interface 240 may provide credentials to the authentication engine 210 based on the user successfully logging into the user interface 240. For example, the user interface 240 may provide the credentials in accordance with a single sign-on scheme, may authenticate the user with a directory server that provides credentials to the authentication engine 210, may provide a certificate generated by a smart card, or the like. Alternatively, or in addition, the user interface 240 may authenticate a user badge, a mobile phone, or the like and may provide credentials to the authentication engine 210 in accordance with a single sign-on scheme, a directory server authentication scheme, or the like.

The system 200 may include a credential engine 220. The credential engine 220 may determine rights of the user. The credential engine 220 may determine the rights of the user to access physical locations. In an example, the credential engine 220 may store an indication of the user or user credentials in association with locations to which the user has access rights. Alternatively, or in addition, the credential engine 220 may be communicatively coupled with a storage device that associates indications of users or user credentials with locations to which the user has access rights. The credential engine 220 may be communicatively coupled to a digital lock 250, such as a badge reader, a Bluetooth lock, an NFC lock, or the like. The system 200 may or may not include the digital lock 250. The credential engine 220 or the storage device may store indications of digital locks, such as an identifier, network address, etc., accessible with the user credential rather than, or in addition to, an indication of the location to which the user has access.

The credential engine 220 may generate a credential for the telepresence robot 260. The credential may be usable to access a physical location. The credential engine 220 may generate the credential based on the rights of the user. For example, the credential may have the same rights as the user, may have fewer rights than the user, or the like. The telepresence robot 260 may be prohibited from entering certain locations, so the credential may not include rights to those locations regardless of the user's rights. In an example, the credential may have the same rights as the user but may be a distinct credential from the user's credential. Alternatively, or in addition, the credential engine 220 may associate the user's credential with the telepresence robot 260.

The credential engine 220 may update an authentication server with the credential generated for the telepresence robot. For example, the digital lock 250 may be communicatively coupled with the authentication server. When a badge is presented to the digital lock, the digital lock 250 may communicate information received from a badge to the authentication server, which may indicate to the digital lock 250 whether to allow access. The update to the authentication server may immediately cause the digital lock 250 to allow access to the telepresence robot 260. In some examples, the credential engine 220 may include the authentication server. Alternatively, or in addition, the credential engine 220 may be communicatively coupled to the authentication server, but the system 200 may not include the authentication server.

The telepresence robot 260 may include a badge 265. The badge 265 may include a magnetic strip, an RFID tag, a smart card, Bluetooth, NFC, WiFi, or the like. In some examples, the badge 265 may be permanently programmed with an identifier. The credential engine 220 may associate the identifier with the generated credential in the authentication server. Accordingly, the digital lock 250 may read the identifier or information derived from the identifier from the badge and may transmit the identifier or information to the authentication server. Based on the identifier or information, the authentication server may determine whether the generated credential includes access to the location protected by the digital lock 250. The authentication server may indicate to the digital lock 250 whether to allow access.

In some examples, the badge 265 may be temporarily programmable with an identifier. The credential engine 220 or the telepresence robot 260 may generate a temporary identifier when the credential engine 220 generates the credential for the telepresence robot 260. The credential engine 220 may communicate the temporary identifier to the telepresence robot 260, or the telepresence robot 260 may communicate the temporary identifier to the credential engine 220. The credential engine 220 may associate the temporary identifier with the generated credential in the authentication server. The telepresence robot 260 may program the badge 265 with the temporary identifier. Accordingly, the digital lock 250 may read the temporary identifier or information derived therefrom and may communicate the identifier or information to the authentication server. The authentication server may indicate based on the credential whether the digital lock 250 should allow access.

In an example, the telepresence robot 260 may program the badge 265 with an identifier associated with the user, such as an identifier from the user's badge. The user's identifier may remain associated with the user's credential in the authentication server, so the telepresence robot 260 may be able to access locations accessible to the user. In some examples, the credential engine 220 may associate a temporary or permanent identifier of the telepresence robot 260 with the user credential rather than generating a distinct credential at the authentication server. In some examples, the credentials may be stored in the badge 265 rather than in an authentication server. The telepresence robot 260 may program the badge 265 with a credential generated by the credential engine 220, and the digital lock 250 may verify the credential.

The system 200 may include a telepresence engine 230. The telepresence engine 230 may provide control of the telepresence robot 260 to the user. For example, the telepresence engine 230 may communicatively couple the user interface 240 to the telepresence robot 260. The telepresence engine 230 may establish a connection directly between the user interface 240 and the telepresence robot 260, or communications between the user interface 240 and the telepresence robot 260 may be routed through the telepresence engine 230 for the duration of the user controlling the telepresence robot 260. The telepresence robot 260 may communicate video, audio, sensor measurements, or the like to the user interface 240. The user interface 240 may communicate video, audio, commands to actuate motors, commands to navigate the telepresence robot 260, or the like to the telepresence robot 260. The system 200 may include the telepresence robot 260, or the system 200 may be communicatively coupled to, but not include, the telepresence robot 260.

When the user has ceased control of the telepresence robot 260, the credential engine 220 may remove the access rights of the user from the telepresence robot 260. For example, the credential engine 220 may delete the credential generated for the telepresence robot 260 from the authentication server. If the badge 265 includes a temporary identifier, a user identifier, a credential, or the like, the credential engine 220 may instruct the telepresence robot 260 to remove the identifier, credential, etc. from the badge 265. Alternatively, or in addition, the telepresence robot 260 may remove the identifier, credential, etc. from the badge 265 in response to the user ceasing control without receiving an indication from the credential engine 220 to do so.

The user may cease control of the telepresence robot 260 while the telepresence robot 260 is in a secure location, such as a location to which another user does not have access. Accordingly, the credential engine 220 may determine whether the other user has the right to access the current location of telepresence robot 260 when the other user attempts to initiate control of the telepresence robot 260. Based on a determination the other user does not have the right to access the current location, the telepresence engine 230 may deny control of the telepresence robot 260 to the other user. In some examples, the telepresence engine 230 or the telepresence robot 260 may navigate to a default location when the user terminates control of the telepresence robot 260. The telepresence engine 230 or the telepresence robot 260 may prevent transmission of video, audio, sensor measurements, or the like or control of navigation or motors while the telepresence robot 260 is navigating to the default location. Accordingly, the other user may initiate a connection with the telepresence robot 260 but not receive access to the secure location. Alternatively, or in addition, the telepresence engine 230 may not allow the other user to take control of the telepresence robot 260 until it has navigated to the default location or to a location to which the other user does have access rights. If the other user does have access rights to the secure location and connects while the telepresence robot 260 is travelling to the default location, the other user may take full control of the telepresence robot 260, receive data feeds (e.g., video, audio, sensor measurements, etc.), and override navigation to the default location.

In some examples, the credential engine 220 may provide a default credential to the telepresence robot 260 when the user terminates control. Some secure locations may include digital locks to exit the secure location. The telepresence robot 260 may use the default credential to leave a secure location having a digital lock to exit the secure location. The default location may be secured by a digital lock, so the telepresence robot 260 may use the default credential to access the default location. To provide the default credential, the credential engine 220 may associate the default credential with an identifier of the telepresence robot in the authentication server. The credential engine 220 may generate a temporary identifier and provide it to the telepresence robot 260, or the telepresence robot 260 may generate the temporary identifier and provide it to the credential engine 220. Alternatively, or in addition, the telepresence robot 260 may include a permanent identifier, or the telepresence robot 260 or the credential engine 220 may provide a default identifier to the badge 265. The credential engine 220 may remove the default credential or the identifier based on the telepresence robot 260 arriving at the default location or passing all locks necessary to reach the default location. Thus, the system 200 may allow the user to navigate the telepresence robot 260 to secure locations without compromising the security of those locations or preventing use of the telepresence robot 260 by users without rights to some locations.

Figure 3:
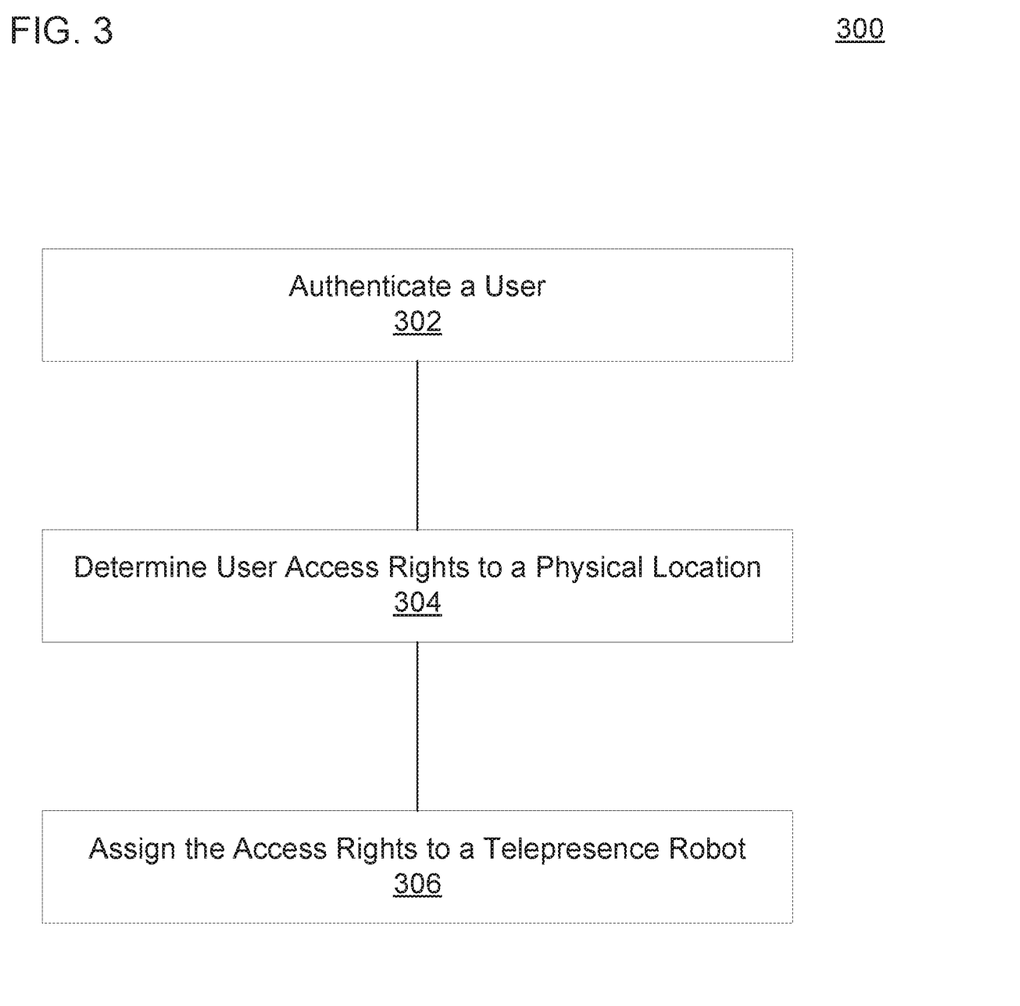
FIG. 3 is a flow diagram of an example method to assign access rights to a telepresence robot.

FIG. 3 is a flow diagram of an example method 300 to assign access rights to a telepresence robot. A processor may perform the method 300. At block 302, the method 300 may include authenticating a user. For example, the user may directly or indirectly provide authentication information. Authenticating the user may include verifying the authentication information is correct.

At block 304, the method 300 may include determining access rights of a user to a physical location. The physical location may be a secure location that credentials are used to access. Determining the access rights may include determining which locations the user is able to access with the user's credentials. In some examples, determining the access rights may include retrieving a stored indication of the access rights. At block 306, the method 300 may include assigning the access rights to the telepresence robot. Assigning the access rights may include providing a credential to the telepresence robot with the same access rights as the user. Referring to FIG. 1, for example, the authentication engine 110 may authenticate the user, and the credential engine 120 may determine access rights of the user and assign the access rights to the telepresence robot.

Figure 4:
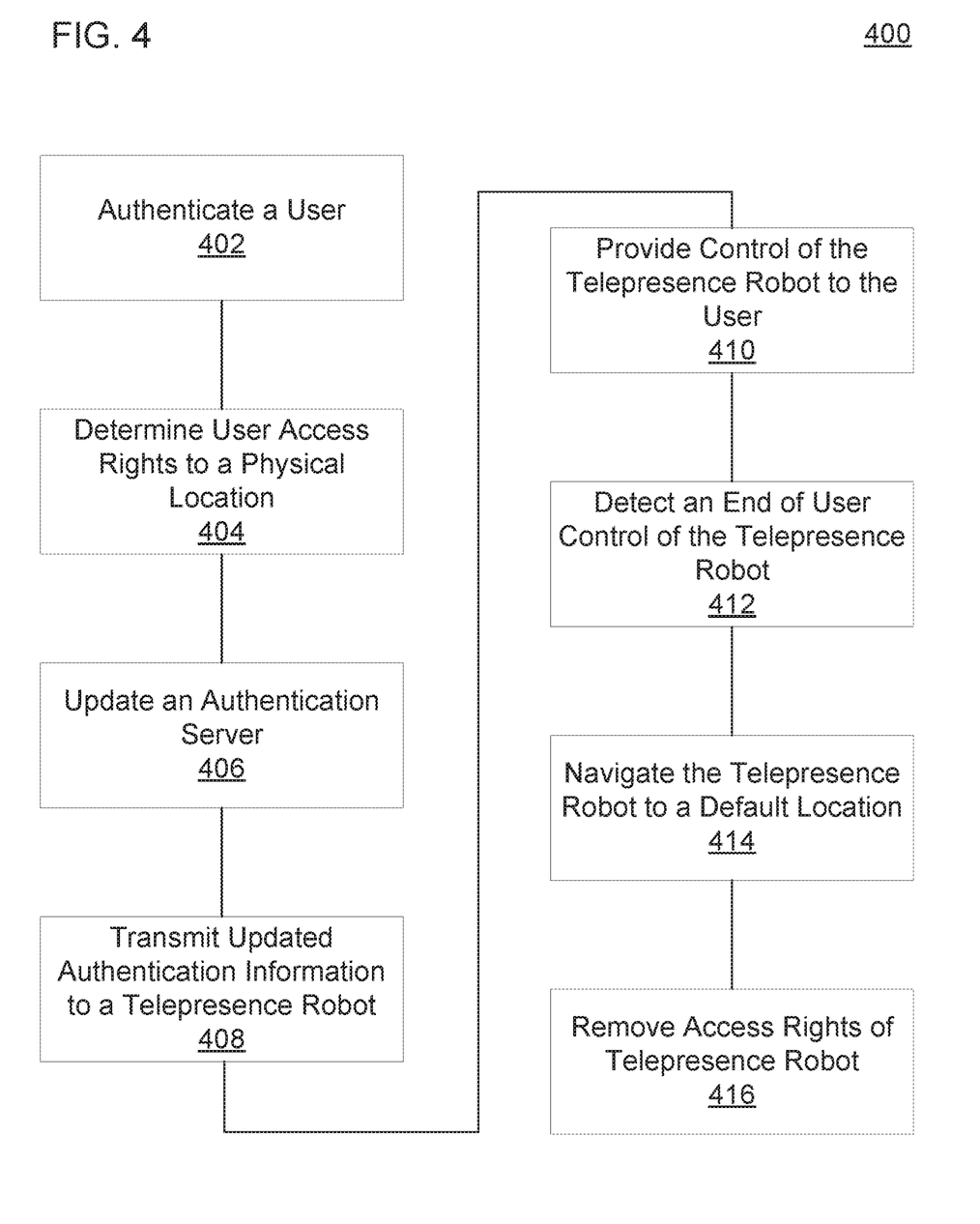
FIG. 4 is a flow diagram of another example method to assign access rights to a telepresence robot.

FIG. 4 is a flow diagram of another example method 400 to assign access rights to a telepresence robot. A processor may perform the method 400. At block 402, the method 400 may include authenticating a user. Authenticating the user may include verifying login information, a smart card certificate, a one-time password, information read by a badge reader or from a mobile phone, or the like. Alternatively, or in addition, authenticating may include receiving a token associated with a single sign-on scheme, authenticating the user with a directory server, or the like. Authenticating the user may include information identifying the user. The user may be authenticated in response to the user requesting to control the telepresence robot.

At block 404, the method 400 may include determining access rights of the user to physical locations. For example, determining the access rights may include retrieving an indication of the access rights from a storage device based on the information identifying the user. In an example, the indication of the access rights may be stored in an authentication server, and determining the access rights may include reading the access rights from the authentication server. The access rights may be stored in a single location, or spread across a plurality of locations. Determining the access rights may include assembling the access rights from the plurality of locations.

The method 400 may include assigning the access rights to the telepresence robot. To assign the access rights, at block 406, the method 400 may include updating an authentication server. The authentication server may be updated with access rights for the telepresence robot. In an example, the access rights for the telepresence robot may be the same as the access rights for the user. Alternatively, or in addition, the telepresence robot may be prohibited from accessing particular locations and may not receive access rights to those locations regardless of the user's access rights. Updating the authentication server may include associating an indication of the access rights with an identifier of the telepresence robot in the authentication server, associating an indication of an identifier of the telepresence robot with each lock, or the like.

At block 408, the method 400 may include transmitting updated authentication information to the telepresence robot. In some examples, assigning the access rights may include transmitting the updated authentication information to the telepresence robot. The authentication information may include an identifier. The telepresence robot may program a badge, transmitter, etc. to include the authentication information, the identifier, or the like. To access a location, the telepresence robot may present the identifier or information derived from the identifier to a digital lock. The digital lock may provide the information to the authentication server, which may determine whether access is permitted based on the update provided at block 406. The identifier may be a temporary identifier, an identifier associated with the user, or the like. The temporary identifier may be generated during block 406, block 408, or the like.

At block 410, the method 400 may include providing control of the telepresence robot to the user. Providing control may include establishing a connection, such as a network connection, directly between the user and the telepresence robot. Alternatively, or in addition, providing control may include establishing a connection routed through a central server. Establishing the connection may include instructing the telepresence robot to transmit video, audio, sensor data, or the like to the user. Establishing control may include instructing the telepresence robot to receive video, audio, commands to actuate motors, commands to navigate the telepresence robot, or the like from the user.

At block 412, the method 400 may include detecting an end of user control of the telepresence robot. The user may actively terminate the connection with the telepresence robot; the connection may terminate due to inactivity; the connection may terminate due to a loss of a network connection; or the like. The end of user control may be detected based on receiving an indication from the user or the telepresence robot that the connection has been terminated, based on detecting a loss of connection between a central server and the user or the telepresence robot, based on no longer receiving an indication the connection is active, or the like.

At block 414, the method 400 may include navigating the telepresence robot to a default location. The telepresence robot may be navigated to the default location based on the detection of the end of user control of the telepresence robot. The telepresence robot may continue to have access rights while it is navigated to the default location, or default access rights may be provided to the telepresence robot. Navigating the telepresence robot to the default location may include a single command to navigate to the default location, a plurality of navigation or motor commands to direct the telepresence robot to the default location, or the like. The telepresence robot may use the access rights to access the default location.

Block 416 may include removing access rights of the telepresence robot. The access rights may be removed based on the telepresence robot arriving at the default location, based on the telepresence robot no longer needing the access rights to reach the default location, or the like. Removing the access rights may include updating the authentication server to no longer include the access rights in association with the telepresence robot. Removing the access rights may include instructing the telepresence robot to delete authentication information, program a badge, transmitter, or the like to not include the authentication information, identifier, etc. In an example, the authentication engine 210 of FIG. 2 may perform block 402, the credential engine 220 may perform blocks 404, 406, 408, or 416, and the telepresence engine 230 may perform blocks 410, 412, or 414.

Figure 5:
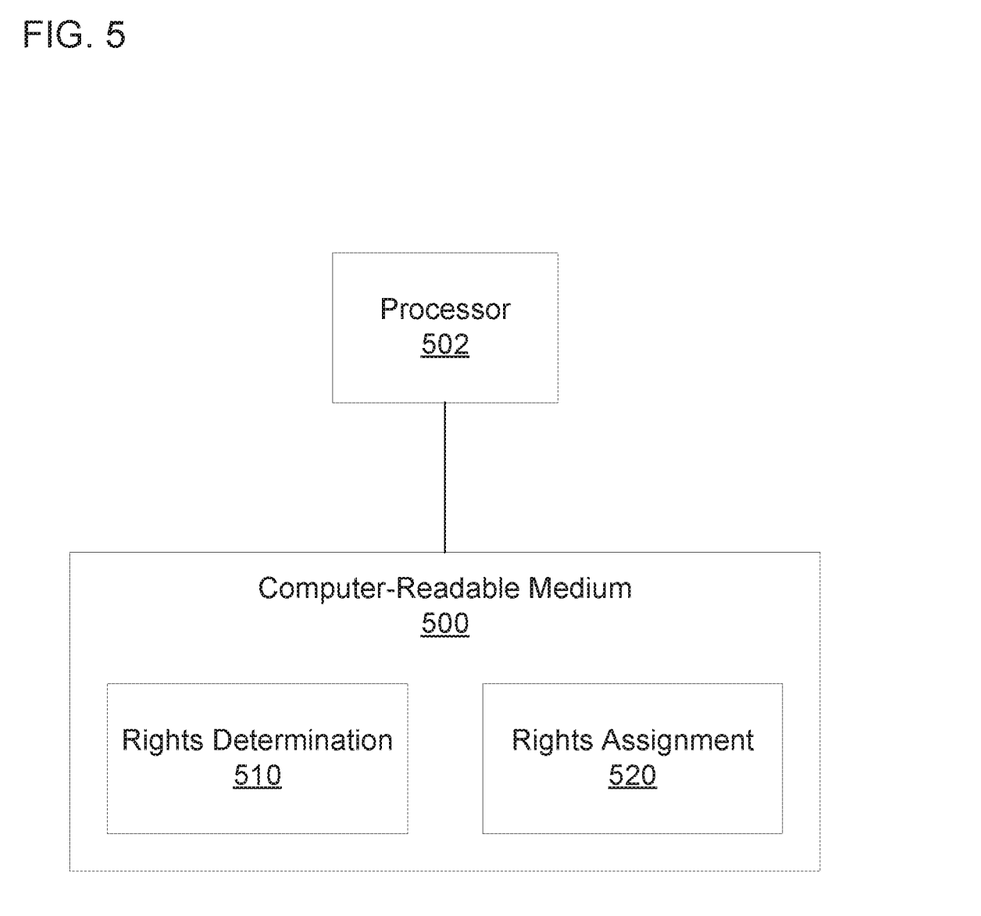
FIG. 5 is a block diagram of an example computer-readable medium including instructions that cause a processor to assign access rights to a telepresence robot.

FIG. 5 is a block diagram of an example computer-readable medium 500 including instructions that, when executed by a processor 502, cause the processor 502 to assign access rights to a telepresence robot. The computer-readable medium 500 may be a non-transitory computer readable medium, such as a volatile computer readable medium (e.g., volatile RAM, a processor cache, a processor register, etc.), a non-volatile computer readable medium (e.g., a magnetic storage device, an optical storage device, a paper storage device, flash memory, read-only memory, non-volatile RAM, etc.), and/or the like. The processor 502 may be a general purpose processor or special purpose logic, such as a microprocessor, a digital signal processor, a microcontroller, an ASIC, an FPGA, a programmable array logic (PAL), a programmable logic array (PLA), a programmable logic device (PLD), etc.

The computer-readable medium 500 may include a rights determination module 510. As used herein, a "module" (in some examples referred to as a "software module") is a set of instructions that when executed or interpreted by a processor or stored at a processor-readable medium realizes a component or performs a method. The rights determination module 510 may include instruction that, when executed, cause the processor 502 to determine access rights of a telepresence robot to a physical location based on access rights of a user that is to control the telepresence robot. The rights determination module 510 may cause the processor 502 to determine whether or not the telepresence robot will have access to a particular physical location based on whether or not the user has access to that location.

The computer-readable medium 500 may include a rights assignment module 520. The rights assignment module 520 may cause the processor 502 to assign the determined access rights to the telepresence robot. The rights assignment module 520 may cause the processor 502 to update the telepresence robot, update a security system, or the like with the determined access rights. The updates may allow the telepresence robot to access the physical location. In an example, the rights determination module 510 or the rights assignment module 520, when executed by the processor 502, may realize the credential engine 120 of FIG. 1.

Figure 6:
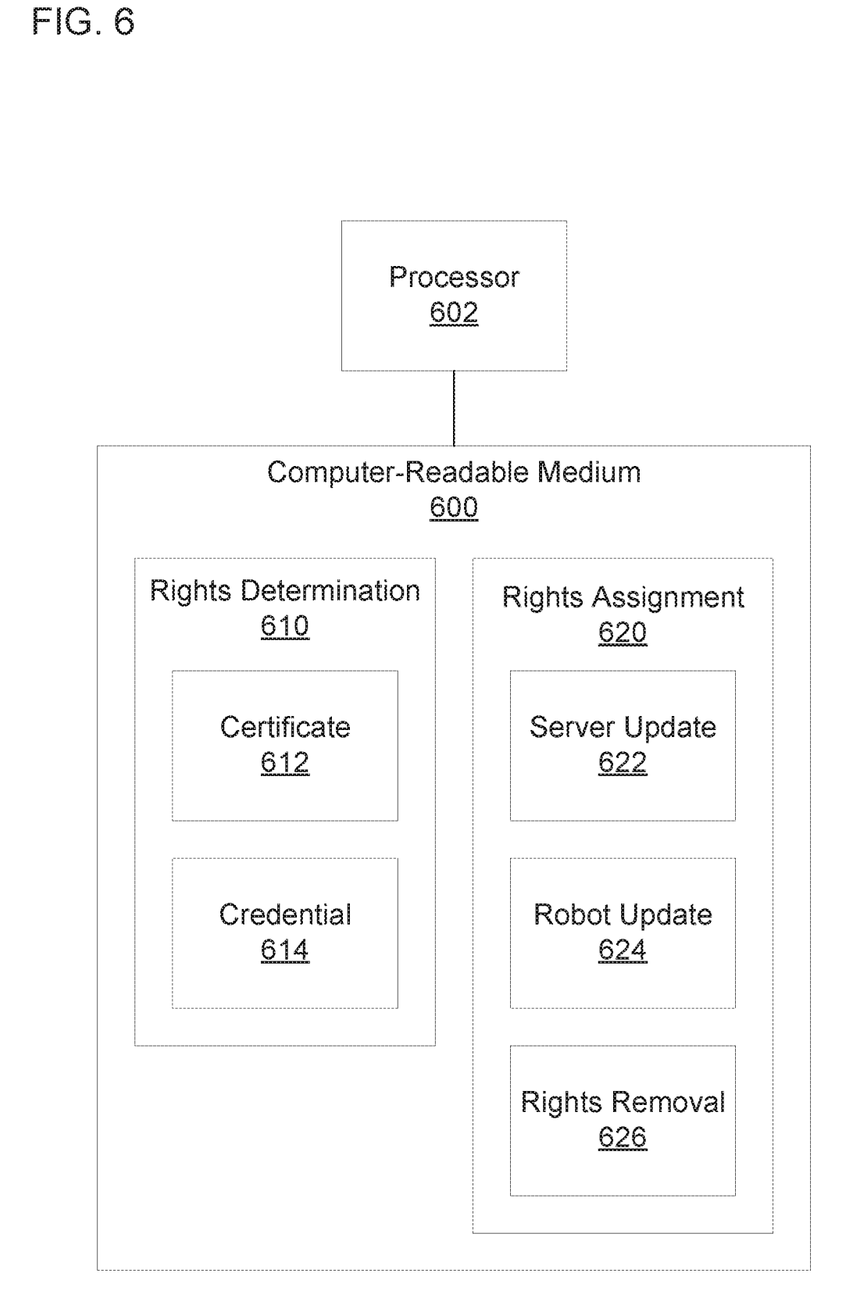
FIG. 6 is a block diagram of another example computer-readable medium including instructions that cause a processor to assign access rights to a telepresence robot.

FIG. 6 is a block diagram of another example computer-readable medium 600 including instructions that, when executed by a processor 602, cause the processor 602 to assign access rights to a telepresence robot. The computer-readable medium 600 may include a rights determination module 610. The rights determination module 610 may include instructions that, when executed, cause the processor 602 to determine access rights of a telepresence robot to a physical location based on access rights of a user that is to control the telepresence robot. In an example, the rights determination module 610 may cause the processor 602 to determine the access rights of the user. The rights determination module 610 may cause the processor 602 to retrieve an indication of the access rights of the user, retrieve a credential providing the access rights to the user, or the like. Based on the access rights determined for the user, the rights determination module 610 may cause the processor 602 to determine the access rights for the telepresence robot. The rights determination module 610 may cause the processor 602 to determine that the telepresence robot has the same rights as the user, has fewer rights than the user, or the like. In some examples, the rights determination module 610 may cause the processor 602 to determine the access rights of the telepresence robot by retrieving the access rights of the user without performing any analysis of those access rights.

In the illustrated example, the rights determination module 610 includes a certificate module 612. The certificate module 612 may cause the processor 602 to determine access rights of the user based on a certificate from an authentication engine. The authentication engine may include a smart card, a user interface, or the like. The authentication engine may generate the certificate based on successfully authenticating the user. The certificate module 612 may cause the processor 602 to receive the certificate from the authentication engine. The certificate module 612 may cause the processor 602 to verify the certificate is valid. The certificate module 612 may cause the processor 602 to identify the user based on the certificate and retrieve the access rights from, e.g., an authentication server based of the identification of the user. Alternatively, or in addition, the certificate module 612 may cause the processor 602 to receive an indication of the access rights with the certificate.

In the illustrated example, the rights determination module 610 may also include a credential module 614. The rights determination module 610 may include the credential module 614 instead of or in addition to the certificate module 612. The credential module 614 may cause the processor 602 to determine the access rights of the user based on receiving user credentials. The credential module 614 may cause the processor 602 to receive the credentials from an authentication server, from a user interface, or the like. The credentials may specify which locations the user is able to access. Accordingly, the credential module 614 may cause the processor 602 to determine which locations the user is able to access based on the credential. In some examples, the credential module 614 may cause the processor 602 to determine the access rights by retrieving the credential without analyzing the credential.

The computer-readable medium 600 may include a rights assignment module 620. The rights assignment module 620 may cause the processor 602 to assign the determined access rights to the telepresence robot. In the illustrated example, the rights assignment module 620 includes a server update module 622. The server update module 622 may cause the processor 602 to update a server communicatively coupled with a badge reader. The server update module 622 may cause the processor 602 to update the server to include the determined access rights. The server update module 622 may cause the processor 602 to update the server with a credential for the telepresence robot. In some examples, the credential for the telepresence robot may have the same access rights as the credential for the user. Once the server is updated, the badge readers may provide access to the telepresence robot based on the determined access rights.

In the illustrated example, the rights assignment module 620 may also include a robot update module 624. The rights assignment module 620 may include the robot update module 624 instead of or in addition to the server update module 622. The robot update module 624 may cause the processor 602 to provide updated authentication information to the telepresence robot. In an example, the robot update module 624 may cause the processor 602 to provide a temporary identifier generated for the telepresence robot, a credential generated based on the user credential, or the like. The robot update module 624 may cause the processor 602 to provide a user identifier or credential to the telepresence robot. In an example, the robot update module 624 may cause the processor 602 to update the telepresence robot with a user identifier received from the user by the rights determination module 610 without updating a server. The telepresence robot may program a badge, a transmitter, or the like with the identifier, the credential, information derived from the identifier or credential, or the like.

The rights assignment module 620 may include a rights removal module 626. The rights removal module 626 may cause the processor 602 to determine that the user is no longer controlling the telepresence robot. For example, the rights removal module 626 may cause the processor 602 to receive an indication from the user or the telepresence robot that the user is no longer controlling the telepresence robot. Alternatively, or in addition, the rights removal module 626 may cause the processor 602 to detect a lack of communication between the telepresence robot and the user, a failure of the telepresence robot or the user to acknowledge the user is still controlling the telepresence robot, or the like. Based on determining the user is no longer controlling the telepresence robot, the rights removal module 626 may cause the processor 602 to remove the access rights of the telepresence robot. For example, the rights removal module 626 may cause the processor 602 to instruct the server update module 622 or the robot update module 624 to cause the processor 602 to remove the access rights. The server update module 622 or the robot update module 624 may cause the processor 602 to remove the access rights from the server, the telepresence robot, or the like. Referring to FIG. 2, the rights determination module 610, the rights assignment module 620, or their constituent modules may realize the credential engine 220, for example, when executed by the processor 602.

The above description is illustrative of various principles and implementations of the present disclosure. Numerous variations and modifications will become apparent to those skilled in the art once the above disclosure is fully appreciated. Accordingly, the scope of the present application should be determined only by the following claims.

What is claimed is:

1. A system comprising:
an authentication engine to authenticate user credentials of a user;
a credential engine to:
determine rights of the user;
generate a credential for a telepresence robot, the credential having the rights of the user, wherein the credential is usable to unlock a digital lock and access a physical location; and
instruct the telepresence robot to program a badge with an identifier corresponding to the credential; and
a telepresence engine to provide control of the telepresence robot to the user.

2. The system of claim 1, wherein the credential engine is to instruct the telepresence robot to program the badge with an identifier different from an identifier of a user badge.

3. The system of claim 1, wherein the credential engine is to associate the credential with an identifier of a badge of the telepresence robot.

4. The system of claim 1, wherein the credential engine is to determine the telepresence robot is in a location for which a different user does not have rights, and based on the determination, the telepresence engine is to deny the different user control of the telepresence robot.

5. A method, comprising:
   authenticating a user;
   determining, using a processor, access rights of the user to physical locations;
   generating, using the processor, a credential for a telepresence robot, the credential having the rights of the user; and
   assigning the access rights to the telepresence robot, wherein assigning the access rights includes programming by the telepresence robot a badge with authentication information corresponding to the credential.

6. The method of claim 5, wherein assigning the access rights comprises assigning the access rights to the telepresence robot while the user controls the telepresence robot and removing the access rights from the telepresence robot based on an end of user control of the telepresence robot.

7. The method of claim 6, wherein removing the access rights comprises navigating the telepresence robot to a default location and removing the access rights based on the telepresence robot arriving at the default location.

8. The method of claim 5, wherein assigning the access rights comprises updating an authentication server.

9. The method of claim 5, wherein assigning the access rights comprises transmitting updated authentication information to the telepresence robot.

10. A non-transitory computer-readable medium comprising instructions that, when executed by a processor, cause the processor to:
   determine access rights of a telepresence robot to a physical location based on access rights of a user, the user to control the telepresence robot; and
   assign the determined access rights to the telepresence robot by instructing the telepresence robot to program a badge with authentication information corresponding to thea credential or updating a server communicatively coupled with a badge reader.

11. The computer-readable medium of claim 10, wherein the instructions cause the processor to determine access rights of the user based on a certificate from an authentication engine.

12. The computer-readable medium of claim 10, wherein the instructions cause the processor to determine access rights of the user based on receiving user credentials.

13. The computer-readable medium of claim 10, wherein the instructions cause the processor to determine the user is no longer controlling the telepresence robot and remove the access rights of the telepresence robot based on the determination the user is no longer controlling the telepresence robot.

14. The computer-readable medium of claim 10, wherein the instructions that cause the processor to assign access right include instructions that cause the processor to update the server communicatively coupled with the badge reader.

15. The system of claim 1, wherein the credential is usable to unlock the digital lock by the telepresence robot communicating the credential to the digital lock over a short range wireless protocol.

16. The system of claim 15, wherein the digital lock is selected from the group consisting of a badge reader, a Bluetooth lock, an NFC lock.

17. The computer-readable medium of claim 10, wherein the badge is selected from the group consisting of a card including a magnetic strip, a radio frequency identification (RFID) tag, and a smart card.

* * * * *